United States Patent
Fan

(10) Patent No.: US 7,272,984 B2
(45) Date of Patent: Sep. 25, 2007

(54) ELECTRONIC APPLIANCE HOLDING DEVICE

(76) Inventor: Eagle Fan, No. 133, Cheng-Kung 6 St., Chu-Pei City, Hsinchu Hsien (TW)

( * ) Notice: Subject to any disclaimer, the term of this patent is extended or adjusted under 35 U.S.C. 154(b) by 749 days.

(21) Appl. No.: 10/832,437

(22) Filed: Apr. 27, 2004

(65) Prior Publication Data
US 2005/0236536 A1   Oct. 27, 2005

(51) Int. Cl.
*F16H 27/02* (2006.01)
(52) U.S. Cl. .................. 74/89.17; 74/109; 248/231.61
(58) Field of Classification Search ............. 74/89.17, 74/109; 248/307, 231.61, 918
See application file for complete search history.

(56) References Cited

U.S. PATENT DOCUMENTS 6,789,773 B2 * 9/2004 Holland ................ 248/307

2004/0056163 A1 * 3/2004 Holland ................ 248/307
2007/0063115 A1 * 3/2007 Ye ....................... 248/231.61

* cited by examiner

Primary Examiner—David M. Fenstermacher
(74) Attorney, Agent, or Firm—Rabin & Berdo, P.C.

(57) ABSTRACT

An electronic appliance holding device includes two slide plates which are respectively engaged with two gear sets which are matched with each other so that the two slide plates are able to move in opposite directions to adjust the space to hold the electronic appliance. An operation member has a pawl end and a pushing end, wherein the pawl end is engaged with the first gear set to stop rotation of the first gear set and when the pushing end is pushed by the user, the pawl end is disengaged from the first gear set. A cover is mounted on top of the base and a frame is mounted on the cover with a gap defined therebetween for receiving therein a picture.

20 Claims, 6 Drawing Sheets

ELECTRONIC APPLIANCE HOLDING DEVICE

FIELD OF THE INVENTION

The present invention relates to a holding device for adjustably holding electronic appliances with different widths and having a frame for receiving therein a picture.

BACKGROUND OF THE INVENTION

A conventional holding device for clamping electronic appliances, such as cellular phones or personal digital assistants (PDAs), generally includes a fixed sized space so that the cellular phone can be inserted or simply put in that space. The cellular phone or PDA cannot be well positioned and moved in the space when the width of the space is larger than the width of the cellular phone or PDA. If the width of the cellular phone or PDA is wider than the size of the space, the user cannot use the holding device. Some holding device includes dual-direction clamping feature and involves a complicated structure that is expensive and cannot fit the need in the market.

Therefore, it is desired to have a holding device with an adjustable feature so as to hold the electronic appliances of different sizes.

SUMMARY OF THE INVENTION

In accordance with an aspect of the present invention, there is provided a holding device that comprises a base with a cover mounted thereto. A first slide plate and a second slide plate are movably located on two sides of the holding device. The first slide plate has a first rack that is matched with a first gear of a first gear set, and the second slide plate has a second rack that is matched with a four gear of a second gear set. A second gear of the first gear set is matched with a third gear of the second gear set. An operation member has a pawl end for engagement with the second gear and a pushing end that is pushed to release the engagement between the pawl end and the second gear.

The present invention will become more obvious from the following description when taken in connection with the accompanying drawings, which show, for purposes of illustration only, a preferred embodiment in accordance with the present invention.

DETAILED DESCRIPTION OF THE PREFERRED EMBODIMENT

Figure 1:
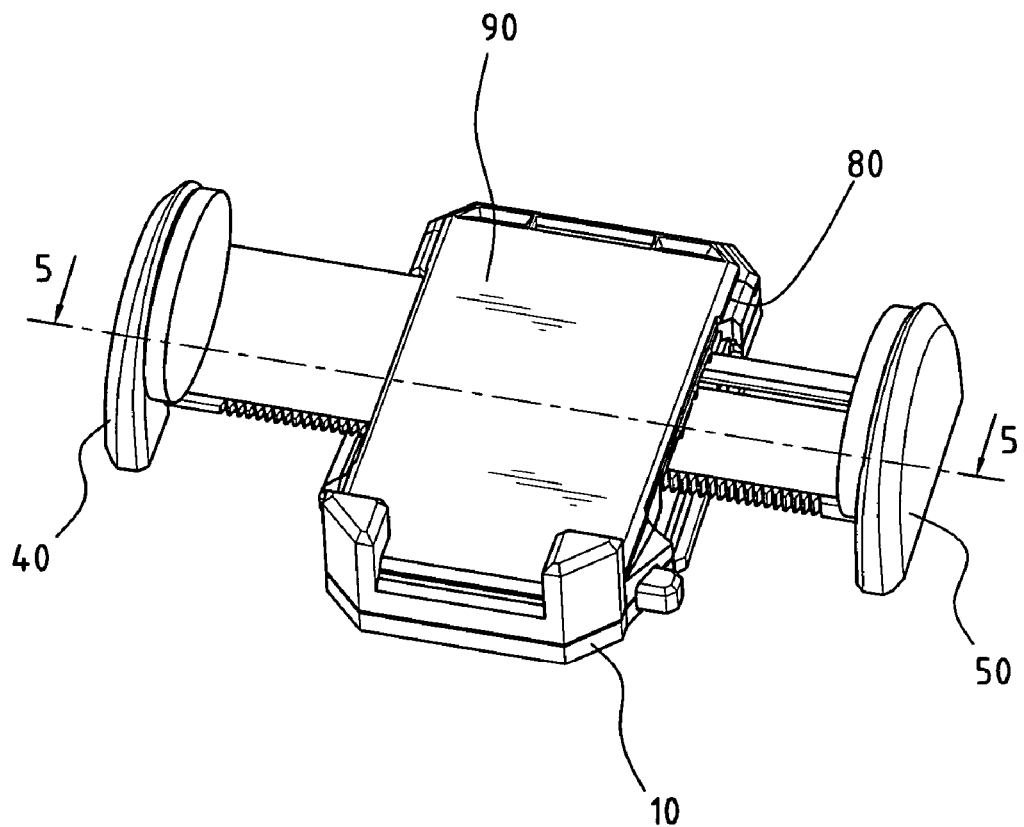
FIG. 1 is an exploded view of a holding device in accordance with the present invention.
Figure 2:
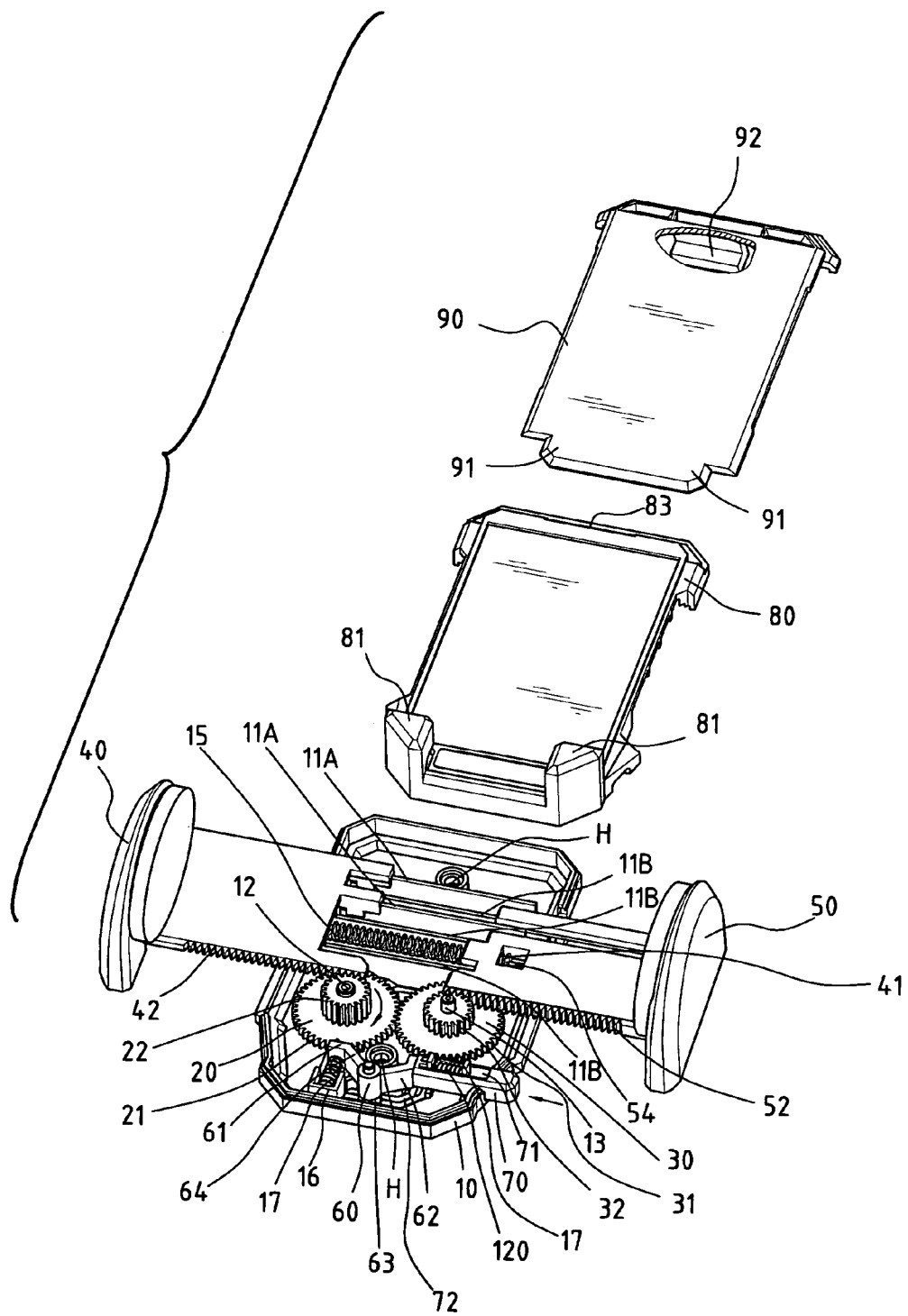
FIG. 2 is an exploded perspective view of the holding device of the present invention.
Figure 3:
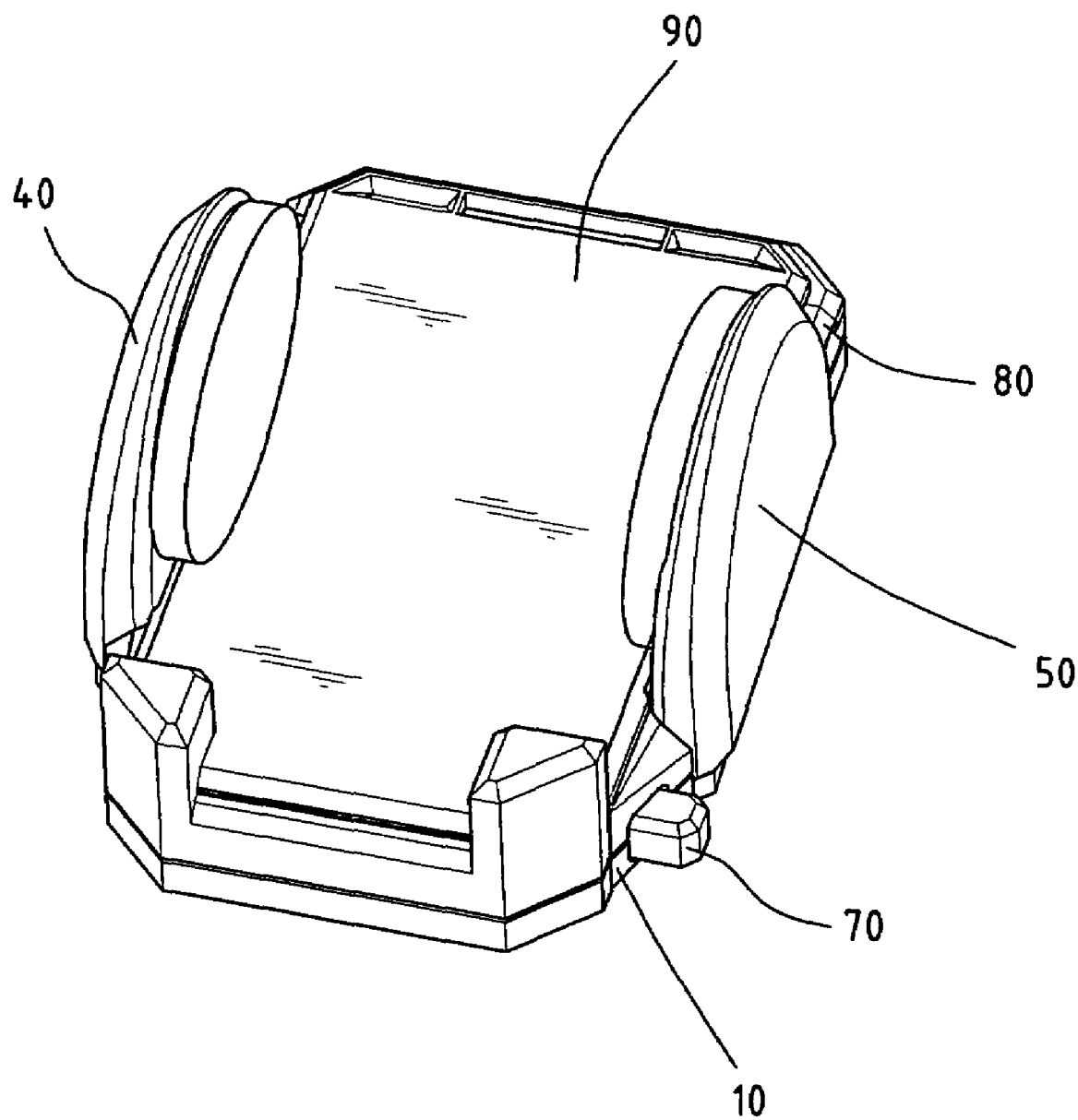
FIG. 3 is a perspective view showing that the two slide plates are moved toward each other.
Figure 4:
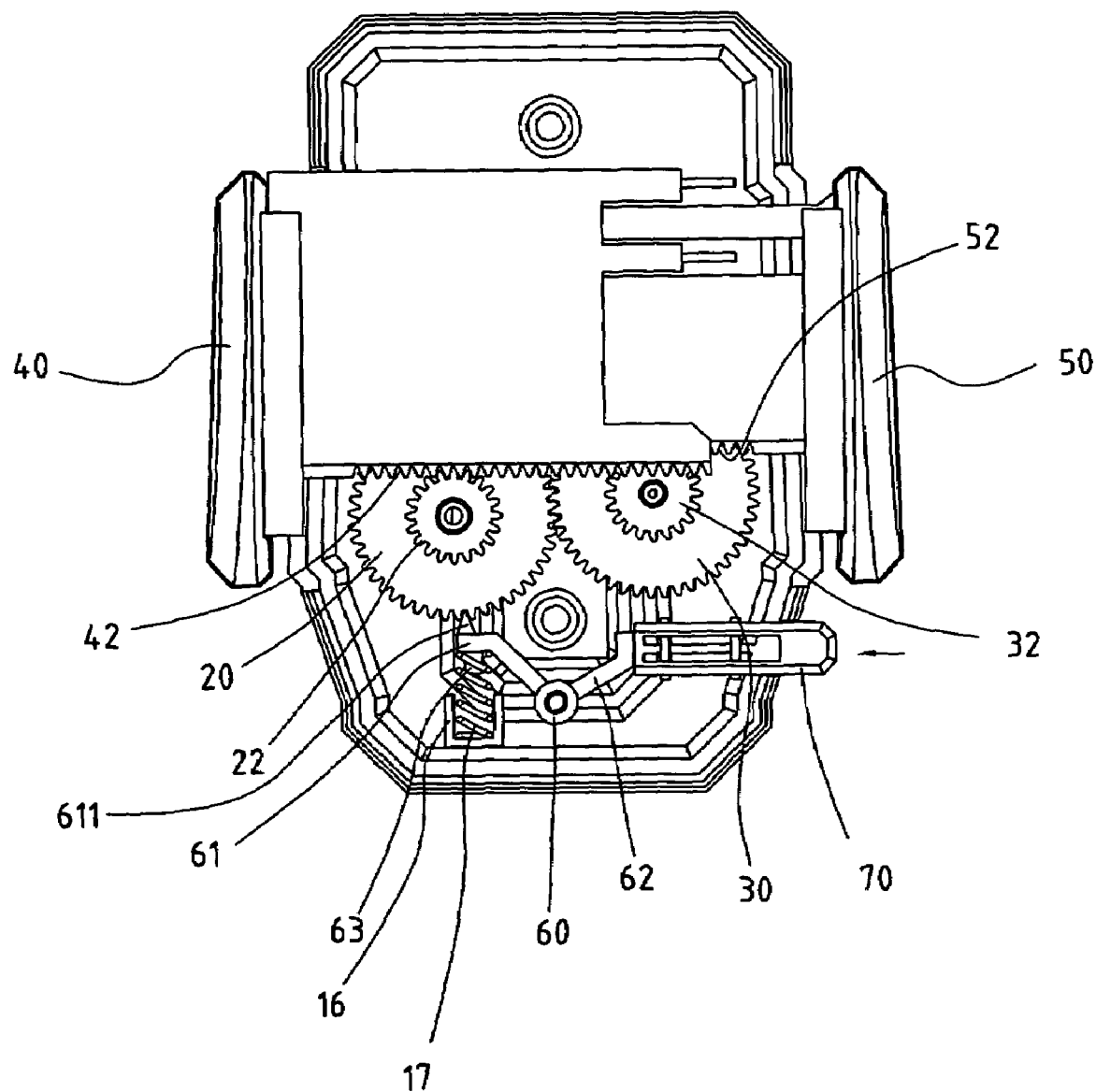
FIG. 4 is a top plan view showing the inner structure when the two slide plates are moved toward each other.
Figure 5:
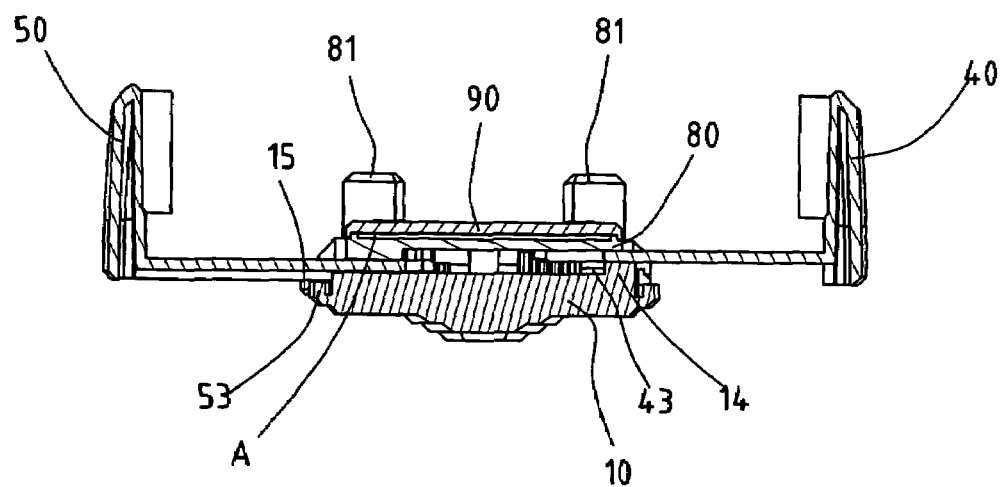
FIG. 5 is a cross-sectional view taken along line 5-5 of FIG. 1.

Referring to the drawings and in particular FIGS. 1 to 5, a holding device of the present invention comprises a base 10 with a cover 80 mounted thereto by extending bolts (not shown) through holes H in the base 10. A transparent frame 90 is provided on top of the cover 80 with a gap defined therebetween for receiving a picture. A first slide plate 40 and a second slide plate 50 are movably inserted in two open sides of the device. The first slide plate 40 and the second slide plate 50 each are an L-shaped member and a part of them are overlapped with each other. The first slide plate 40 has a first rack 42 and the second slide plate 50 has a second rack 52. A first gear set 20 is mounted to a first rod 12 on the base 10 and a second gear set 30 is mounted to a second rod 13 on the base 10. The first gear set 20 includes a first gear 21 and a second gear 22 that is co-axially connected to the first gear 21. The second gear set 30 includes a third gear 31 and a fourth gear 32 that is co-axially connected to the third gear 31. The first gear 21 is engaged with the third gear 31, and the second gear 22 is engaged with the first rack 42 and the fourth gear 32 is engaged with the second rack 52 so that the two slide plates 40 and 50 are movable in opposite directions simultaneously.

The first slide plate 40 and the second slide plate 50 each have two grooves 41 defined in an underside thereof, wherein only the grooves 41 in the first slide plate 40 are shown, and two sets of rails 11A and 11B are located on the base 10 and parallel to each other. The first slide plate 40 are movable on the rails 11A which is engaged with the grooves 41 of the first slide plate 40, and the second slide plate 50 are movable on the other rails 11B which are engaged with the grooves of the second slide plate 50. A first spring 15 has one end positioned by a protrusion 54 at the second slide plate 50 and the other end of the first spring 15 is biased at an end of the first slide plate 40. The first spring 15 provides an outward force to the two slide plates 40 and 50. Further referring to FIGS. 1A and 1B, each of the first slide plate 40 and the second slide plate 50 has a protrusion 43, 53 extending from an underside thereof. Two stop pieces 14 and 15 are located at the base 10 so as to stop the protrusions 43, 53 to prevent the first and second slide plates 40, 50 from dropping from the base 10.

A V-shaped operation member 60 has a pawl end 61 and a pushing end 62 located at two ends of the operation member 60, and a central portion 63 of the operation member 60 is pivotally connected to the base 10. A second spring 17 has one end stopped by a baffle plate 16 on the base 10 and the other end of the second spring 17 biases the pawl end 61 toward the second gear 22 of the first gear set 22. A protrusion 64 is located at a rear end of the pawl end 61 so that the protrusion 64 is pushed by the second spring 17 to abut to a tooth of the first gear 21 and to stop the rotation of the first and second gear sets 20, 30. The pushing end 62 can be pushed to release the engagement between the pawl end 61 and the first gear 21. A pushing rod 70 has one end thereof connected to the pushing end 62 and the other end of the pushing rod 70 extends out from the base 10. A third spring 120 is received in a slot 71 defined through the pushing rod 70 with an end of the third spring 120 being positioned by a protrusion 72. A second plate 17 (see FIG. 2) is located on the base 10 and the other end of the third spring 120 is stopped by the second plate 17.

Figure 6:
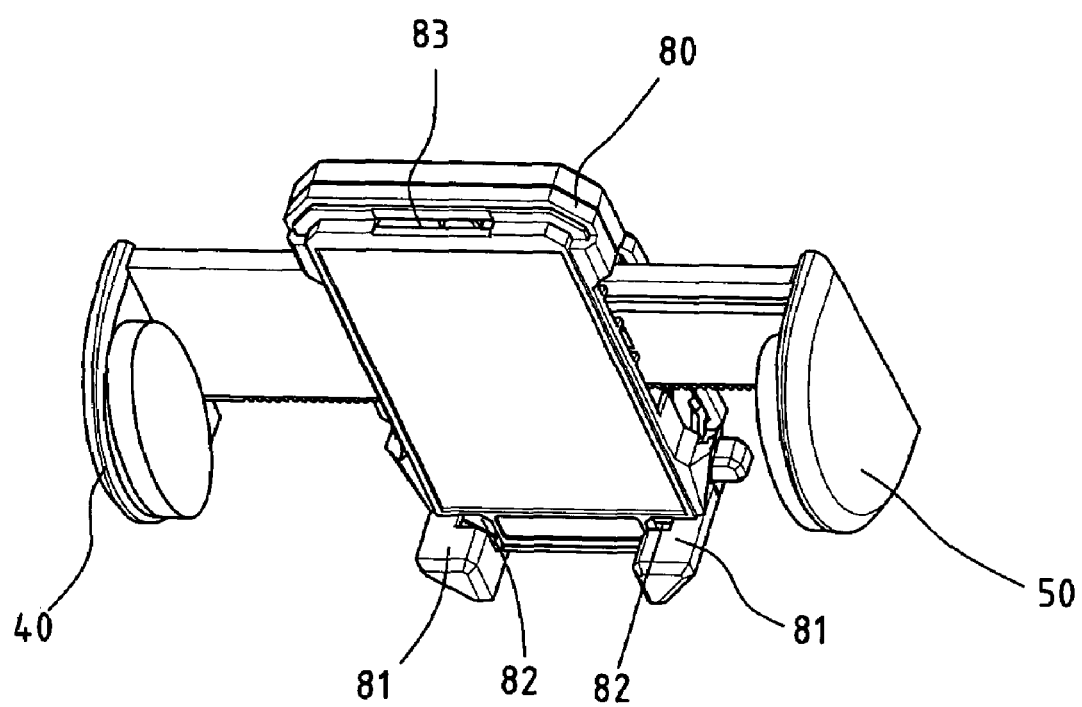
FIG. 6 is a perspective view of the holding device with a frame removed.

A plurality of support members 81 rests on the cover 80. Therefore, when the cellular phone is clamped between the two slide plates 40 and 50, the lower end of the cellular phone is supported by the two support members 81. Extra support members may be located on a lower end of the cover 80. Furthermore, the frame 90 is mounted on top of the cover 80 with a gap A therebetween (see FIG. 5). With reference to FIG. 6; the cover 80 further has two cutouts 82 respectively defined in the two support members 81 to allow two corners 91 of the frame 90 to be inserted therein and a position hole 83 defined adjacent to a top side to allow an L-shaped block 92 formed underside the frame 90 to be inserted therein such that the engagement between the frame 90 and the cover 80 is secured.

The user simply pushes the pushing rod 70 to disengage the pawl end 61 from the first gear 21 so that the two slide plates 40 and 50 are able to be separated to their maximum wide positions and the pawl end 61 is re-engage the first gear 21 to set the desired width between the two slide plates 40 and 50. Therefore, the present invention can clamp the electronic appliances of different sizes conveniently.

While we have shown and described the embodiment in accordance with the present invention, it should be clear to those skilled in the art that further embodiments may be made without departing from the scope of the present invention.

What is claimed is:

1. A holding device comprising:
    a base and a cover which is mounted to the base, a first slide plate and a second slide plate movably located on two sides of the base, the first slide plate and the second slide plate being overlapped with each other and movable in opposite directions simultaneously, the first slide plate having a first rack and the second slide plate having a second rack, a first gear set and a second gear set being rotatably mounted on the base, the first gear set including a first gear and a second gear which is co-axially connected to the first gear, the second gear set including a third gear and a fourth gear which is co-axially connected to the third gear, the first gear engaged with the third gear, the second gear engaged with the first rack and the fourth gear engaged with the second rack, and
    an operation member having a pawl end for selectively engaging with a tooth of the first gear to stop rotation of the first gear set and a pushing end which is pushed to release the engagement between the pawl end and the first gear.

2. The device as claimed in claim 1, wherein the first slide plate and the second slide plate each have a groove defined in an underside thereof, two rails located on the base and parallel to each other, the groove of the first slide plate movably engaged with one of the rails and the groove of the second slide plate movably engaged with the other rail.

3. The device as claimed in claim 1, wherein the base has a first rod to which the first gear set is mounted and a second rod to which the second gear set is mounted.

4. The device as claimed in claim 1, wherein the operation member is a V-shaped member and the pawl end and the pushing end are located at two ends of the operation member, a central portion of the operation member pivotally connected to the base.

5. The device as claimed in claim 3, wherein the operation member is a V-shaped member and the pawl end and the pushing end are located at two ends of the operation member, a central portion of the operation member pivotally connected to the base.

6. The device as claimed in claim 1, wherein a pushing rod has one end thereof connected to the pushing end and the other end of the pushing rod extends out from the base.

7. The device as claimed in claim 5, wherein a pushing rod has one end thereof connected to the pushing end and the other end of the pushing rod extends out from the base.

8. The device as claimed in claim 1, wherein each of the first slide plate and the second slide plate has a protrusion extending from an underside thereof, two stop pieces located at the base so as to stop the protrusions to prevent the first and second slide plates from dropping from the base.

9. The device as claimed in claim 1 further comprising a first spring biased between the first slide plate and the second slide plate to push the first slide plate away from the second slide plate.

10. The device as claimed in claim 7 further comprising a first spring biased between the first slide plate and the second slide plate to push the first slide plate away from the second slide plate.

11. The device as claimed in claim 10 further comprising a second spring which has one end stopped by a first plate on the base and the other end of the second spring biasing the pawl end toward the second gear of the first gear set.

12. The device as claimed in claim 5 further comprising a third spring which is received in a slot defined through the pushing rod, a second plate on the base and the other end of the third spring being stopped by the second plate.

13. The device as claimed in claim 7 further comprising a third spring which is received in a slot defined through the pushing rod, a second plate on the base and the other end of the third spring being stopped by the second plate.

14. The device as claimed in claim 10 further comprising a third spring which is received in a slot defined through the pushing rod, a second plate on the base and the other end of the third spring being stopped by the second plate.

15. The device as claimed in claim 14 further comprising a plurality of support members located on the base and extend through the cover.

16. The device as claimed in claim 15, wherein a thickness of the second gear of the first gear set is thicker than that of the fourth gear of the second gear set.

17. The device as claimed in claim 16, wherein each of the first slide plate and the second slide plate is an L-shaped plate.

18. The device as claimed in claim 17, wherein a plurality of support members are located on a lower end of the cover.

19. The device as claimed in claim 17 further comprising a frame mounted on top of the cover with a gap defined therebetween for receiving therein a picture.

20. The device as claimed in claim 18 further comprising a frame mounted on top of the cover with a gap defined therebetween for receiving therein a picture.

* * * * *